(12) United States Patent
Naritomi et al.

(10) Patent No.: US 9,751,265 B2
(45) Date of Patent: Sep. 5, 2017

(54) METHOD FOR PREPARING A COMPOSITE OF METAL AND RESIN

(71) Applicant: TAISEI PLAS CO., LTD., Tokyo (JP)

(72) Inventors: Masanori Naritomi, Tokyo (JP); Naoki Andoh, Tokyo (JP)

(73) Assignee: TAISEI PLAS Co., Ltd., Tokyo (JP)

( * ) Notice: Subject to any disclaimer, the term of this patent is extended or adjusted under 35 U.S.C. 154(b) by 209 days.

(21) Appl. No.: 14/589,448

(22) Filed: Jan. 5, 2015

(65) Prior Publication Data

US 2015/0108088 A1 Apr. 23, 2015

Related U.S. Application Data

(62) Division of application No. 12/519,896, filed as application No. PCT/JP2007/074749 on Dec. 21, 2007, now abandoned.

(30) Foreign Application Priority Data

Dec. 22, 2006 (JP) .................. 2006-345273

(51) Int. Cl.
  *B29C 45/14* (2006.01)
  *B29C 70/68* (2006.01)
  (Continued)

(52) U.S. Cl.
  CPC ...... *B29C 70/683* (2013.01); *B29C 45/14008* (2013.01); *B29C 45/14221* (2013.01);
  (Continued)

(58) Field of Classification Search
  None
  See application file for complete search history.

(56) References Cited

U.S. PATENT DOCUMENTS 3,959,091 A  5/1976 Moji et al.
5,705,082 A  1/1998 Hinson
(Continued)

FOREIGN PATENT DOCUMENTS

JP  2004-043850 A  2/2004
JP  2005-342895 A  12/2005
WO  2005-046957 A1  5/2005

OTHER PUBLICATIONS

International Search Report of PCT/JP2007/074749, Mailing Date of Feb. 26, 2008.
(Continued)

*Primary Examiner* — Edmund Lee
(74) *Attorney, Agent, or Firm* — Shuji Yoshizaki (57) ABSTRACT

It is an object of the present invention to securely and integrally join a metal and a resin, more particularly, a shaped titanium alloy substrate and a resin composition. A titanium alloy substrate is used that has undergone surface roughening by chemical etching or the like so as to have a ultrafine textured face in which bent, ridge-like protrusions having a width and height of from ten to a few hundred nanometers and a length of from a few to a few hundred microns rise up on the surface at a spacing period of from ten to a few hundred nanometers. A titanium alloy piece 1 with its surface treated is inserted into the cavity of a metallic mold for injection molding 10 and a specific resin composition 4 is injected to obtain an integrated composite 7. The main resin component of the resin composition 4 that is used can be a polyphenylene sulfide resin (PPS) or a polybutylene terephthalate resin (PBT). High injection joining strength is obtained if the resin composition contains, as an auxiliary component, a polyethylene terephthalate resin and/or polyolefin resin in the case of PBT and a polyolefin resin in the case of PPS.

4 Claims, 3 Drawing Sheets (51) Int. Cl.
- *C23F 1/26* (2006.01)
- *B29K 67/00* (2006.01)
- *B29K 81/00* (2006.01)
- *B29K 705/00* (2006.01)
- *B29K 705/08* (2006.01)
- *B29K 705/02* (2006.01)

(52) U.S. Cl.
CPC .......... B29C 45/14311 (2013.01); C23F 1/26 (2013.01); *B29C 2045/14245* (2013.01); *B29C 2045/14868* (2013.01); *B29K 2067/006* (2013.01); *B29K 2081/04* (2013.01); *B29K 2705/00* (2013.01); *B29K 2705/02* (2013.01); *B29K 2705/08* (2013.01); *Y10T 428/24355* (2015.01)

(56) References Cited

U.S. PATENT DOCUMENTS

| | | |
|---|---|---|
| 6,776,918 B1 | 8/2004 | Yoshikawa et al. |
| 2006/0289388 A1 | 12/2006 | Yang et al. |

OTHER PUBLICATIONS

Auther Unknown, Technology Applications Group, DOW 17 Coating, Mar. 16, 2014.

TITANIUM ALLOY

APPARATUS: JSM 7401F
ACCELERATION VOLTAGE(kV): 2.0
MAGNIFICATION: x10,000
IMAGE: LEI
(LOWER DETECTOR)
MEASUREMENT DATE: 11/10/06

FIG.4

APPARATUS: JSM 7401F
ACCELERATION VOLTAGE(kV): 2.0
MAGNIFICATION: x100,000
IMAGE: SEI
(SECONDARY ELECTRON IMAGE)
MEASUREMENT DATE: 11/10/06

FIG.5

FIG.6

METHOD FOR PREPARING A COMPOSITE OF METAL AND RESIN

CROSS-REFERENCE TO RELATED APPLICATIONS

This application is a divisional of U.S. application Ser. No. 12/519,896, filed on Oct. 19, 2009, which is a 371 of International Application No. PCT/JP2007/074749, filed on Dec. 21, 2007, which is based upon and claims the benefit of priority from the prior Japanese Patent Application No. 2006-345273, filed on Dec. 22, 2006, the entire contents of which are incorporated herein by reference.

FIELD OF THE INVENTION

The present invention relates to a composite of a metal part, particularly one made of a titanium alloy, and a resin molded article, which is used for housings of electronic equipments, housings of consumer electrical equipments, mechanical parts and so forth and to a method for manufacturing this composite. More particularly, the present invention relates to a composite, in which a thermoplastic resin composition is integrated with a titanium alloy part made by mechanical working, and to a method for manufacturing this composite and also relates to a composite of metal and resin, which is favorable for use in various mobile electronic equipments, consumer electrical products, medical instruments, automotive structural parts, automotive mounted equipments, other electrical parts and in corrosion resistant exterior trim parts or the like and to a method for manufacturing the composite.

BACKGROUND OF THE INVENTION

Technology for integrating metals and resins is needed in many different fields of industry, such as in manufacturing of parts for automobiles, consumer electrical products, industrial machinery or the like and many adhesive agents have been developed for this purpose. Some very excellent adhesives have been proposed. For example, adhesives that exhibit their function at normal temperature or with heating are used to integrally join metals and synthetic resins and this method is currently a common joining technique.

On the other hand, more rational joining methods that do not involve the use of an adhesive have been studied heretofore. An example is a method in which a high-strength engineering plastic is integrated with a light metal such as magnesium, aluminum, an alloy of these or an iron alloy such as stainless steel without the use of an adhesive. For instance, the inventors proposed a method in which a molten resin is injected onto a metal part that was inserted preliminarily into a metallic mold for injection molding, thereby forming a resin part and at the same time this molded article and the metal parts are joined (hereinafter this will be referred to as "injection joining").

Known technology related to this injection joining is a manufacturing technique in which a polybutylene terephthalate resin (hereinafter referred to as PBT) or a polyphenylene sulfide resin (hereinafter referred to as PPS) is joined by injection joining to an aluminum alloy (see Japanese Patent Application Laid-Open No. 2004-216425: Patent Document 1, for example). A joining technique has also been disclosed in which somewhat large holes are made in an anodized film on a piece of aluminum and a synthetic resin is made to penetrate into these holes and adjoined thereto (see WO/2004-055248-A1: Patent Document 2, for example).

The principle behind this injection joining in Patent Document 1 is as follows. An aluminum alloy is immersed in a dilute aqueous solution of a water-soluble amine compound, the aluminum alloy is finely etched with a weakly basic aqueous solution and at the same time the amine compound molecules are adsorbed to the surface of the aluminum alloy. After undergoing this treatment, the aluminum alloy is inserted in a metallic mold for injection molding and a molten thermoplastic resin is injected under high pressure.

Here, the amine compound molecules adsorbed to the surface of the aluminum alloy encounter the thermoplastic resin and heat is generated. At substantially the same time as this heat generation, the thermoplastic resin is quenched by coming into contact with the aluminum alloy that is held at a mold temperature which is lower than the melting temperature of the thermoplastic resin. The resin that was apt to be crystallized and solidified here is not crystallized as quickly because of the generated heat and gets into ultrafine recesses on the aluminum alloy surface. Consequently, with the composite of aluminum alloy and thermoplastic resin, the resin is securely joined (fixed) to the aluminum alloy and is not separated from the aluminum alloy surface. That is, when an exothermic reaction occurs, a strong injection joint is produced. It has actually been confirmed that PBT or PPS, which can undergo a chemical reaction with an amine compound, can be joined by injection joining to an aluminum alloy. Another well known technique involves chemically etching the surface of a metal part preliminarily, then inserting the metal part into the mold of an injection molding machine and performing injection molding with a thermoplastic resin material (see Japanese Patent Application Laid-Open No. 2001-225352: Patent Document 3, for example).

However, although the joining principle in Patent Document 1 by the inventors does exhibit an extremely good effect with aluminum alloys or the like, it has not effect in injection joining to other metals besides aluminum alloys. Accordingly, there has been a need for the development of a novel technique for joining metals and resins. The inventors discovered such a novel technique in the course of making improvements to their method for joining a hard resin by injection joining to an aluminum alloy. Specifically, conditions were discovered under which injection joining will be possible without any chemical adsorption of the amine compound to the metal part surface or, in other words, without the help of a special exothermic reaction or any particular chemical reaction.

At least two conditions are necessary. The first condition is that a hard resin of high crystallinity be used, that is, that PPS, PBT or an aromatic polyamide be used and, furthermore, that these be suited to injection joining to obtain a further improved composition. Another condition is that the surface layer of the metal part have a suitably rough shape and that the surface be hard.

For example, when a shaped material in which a magnesium alloy serves as the material is used, corrosion resistance is low for a magnesium alloy still covered with a natural oxidized film, so a surface covered with a hard ceramic material can be obtained by subjecting this to chemical conversion treatment or electrolytic oxidation treatment and converting the surface layer into a metal oxide, a metal carbonate or a metal phosphorus oxide. Magnesium alloy parts having these surface layers come close to meet the above-mentioned conditions.

Theoretically, these shaped magnesium alloys with their surface treated are considered as follows, assuming that they are inserted into a metallic mold for injection molding. The mold and the inserted shaped magnesium alloy are generally held at a temperature lower than the melting point of the resin being injected by at least a hundred and several tens of degrees, so there is a high possibility that the temperature of the injected resin may have dropped below its melting point at the time when it is quenched upon entering the channel inside the mold and comes into contact with magnesium alloy part.

Regardless of the crystalline resin, when it is rapidly cooled to below its melting point, it does not become crystallized and solidified immediately (that is, in zero time) and there is some time, albeit extremely short, for the resin to remain in a molten state below the melting temperature or, in other words, in a super-cooled state. If the recesses in the shaped alloy are relatively large with a diameter of several hundred nanometers, then it is possible that the molten resin penetrates into these recesses within the limited time from a super-cooled state to creation of microcrystals. To put this in another way, if the numerical density of the macromolecular microcrystal group that is produced is still low, then the resin can sufficiently penetrate into the recesses as long as the recesses are large with an inside diameter of several hundred nanometers. This is because the size of the microcrystals, specifically microcrystals in which a molecular chain behaving irregularly has undergone a change into some kind of state with order in the molecular chain, is considered to be from several nanometers to 10 nm, as estimated from a molecular model.

Consequently, although the penetration of microcrystals into ultrafine recesses with a diameter of 20 to 30 nm cannot be considered a simple matter, it is concluded that the microcrystals can penetrate as long as the recesses have a diameter of about several hundred nanometers. However, since countless microcrystals are simultaneously generated, the viscosity of the resin flow rises abruptly at the distal end of the injected resin and at places in contact with the mold metal faces. Therefore, if the recesses have a diameter of about 100 nm, the resin may not be able to penetrate all the way to the bottom but will be crystallized and solidified after penetrating considerably into the interior, so fairly good joint strength (fixing strength) is produced. Here, even if the surface of the shaped magnesium alloy is an amorphous layer or a ceramic microcrystal group such as a metal oxide, the resin will be securely anchored within the recesses, provided that the surface layer is hard and strong and has a textured face on the nanometer order, hence, the solidified and crystallized resin will not readily come out of the recesses, which means that joint strength is improved. This textured face on the nanometer order presents a coarse surface as a visual image viewed with an electron micrograph.

Improving the resin composition that is injected is actually the most important element in the present invention. This relationship will be described. When the resin composition is molded for injection molding, it is quenched from a molten state to a temperature below its melting point and attempts to be crystallized and solidified, where a resin composition that is crystallized slowly can afford better joint strength. This is a requirement for resin compositions that are suitable for injection joining.

Based on this, the inventors proposed a technique in which a shaped magnesium alloy is chemically etched and then subjected to chemical conversion treatment or another such surface treatment as mentioned above to make the surface layer ceramic, which allows a hard crystalline resin to be joined by injection joining to this and high joinability to be obtained (Japanese Patent Application Laid-Open No. 2007-301972). This proves the possibility of injection joining even without the chemical adsorption of an amine compound and, when horizontal development is taken into account, also suggests that injection joining can be performed using a PBT or PPS that has been improved for injection joining, as long as at least surface configuration and surface properties are the same for all metals and metal alloys.

Let us now describe what has been disclosed as prior art. Patent Document 3 discloses a method in which chemically etched copper wire is inserted into a metallic mold for injection molding and PPS or the like is injected to produce a lead wire-equipped battery cover having a shape such that several copper wires pass through the middle portion of a PPS disk. According to the technology, even if the internal pressure of the battery rises due to the bumps (roughness) on the surface of the copper wire formed by chemical etching, gas will not leak out through the lead wire part.

The technology disclosed in Patent Document 3 is not the injection joining technology insisted by the inventors but is instead technology that is an extension of existing injection molding technology and is merely one that utilizes the difference in the linear coefficient of expansion of metals and the molding shrinkage of resins. If a resin is injected into the peripheral portion of the structure in which a metal rod-like piece passes through the resin portion, then the molded article is parted from the mold and allowed to be cooled, the rod-like piece is in a situation of being pressed by the surrounding molded resin portion. The reason is that the linear coefficient of expansion of a metal is at most 1.7 to $2.5 \times 10^{-50}$ $C^{-1}$ for an aluminum alloy, magnesium alloy, copper or copper alloy and, even if the molded article has been removed from the mold and cooled to room temperature, the shrinkage of metal will be on the level of the linear coefficient of expansion multiplied by about 100° C. and will be no more than 0.2 to 0.3%.

Further, the object of the technology is to keep gas from leaking out through the joint between the metal and the resin and the technology is premised on the fact that substantially a slight gap is formed, while it is not specifically aimed in the technology to secure the two parts. In other words, it is essential there that a labyrinth effect prevents gas from easily leaking out. Furthermore, concerning with a resin, the molding shrinkage is about 1% for PPS, 0.5% for PPS containing glass fiber and, even for a resin in which the filler content has been increased, the resin part will always shrink more than the metal part after injection molding. Therefore, if a shaped article in which the metal part is disposed in the center and this metal part goes through the resin part is produced by injection molding with an insert, an integrated product can be manufactured in which the metal part is not likely to come loose due to the pressing effect produced by molding shrinkage of the resin portion.

This method for manufacturing an integrated metal and resin product by pressing effect is known conventionally and is used to fabricate a knob on fuel oil stove as an example of a similar molded article. This method involves inserting a thick iron needle with a diameter of about 2 mm into a metallic mold for injection molding and injecting a heat resistant resin or the like into the mold. Jagged cuts (such as knurling) are formed around the needle and the resin is fixed to this so that there may be no movement. In the technology disclosed in Patent Document 3, the texturing process is changed from a physical process to a chemical process, which makes the working process simple as well as the bumps finer and improves gripping effect by using mainly a resin that is hard and crystalline for the resin part.

With the present invention there is no need at all for a pressing effect of resin. A powerful force is required to break an article in which flat plates have been joined. If the joined state of the metal and thermoplastic resin is to be maintained stably over an extended period, it is actually necessary for the linear coefficients of expansion of the two materials to be close in values. The linear coefficient of expansion of a thermoplastic resin composition can be lowered considerably by containing a large amount of glass fiber, carbon fiber or other such reinforcing fiber, where the limit to this is 2 to $3\times10^{-50}$ $C^{-1}$. Kinds of metals that approach this value at close to normal temperature are aluminum, magnesium, copper and silver.

The present invention is related to a technology that makes it possible for a hard resin to be joined by injection joining to a titanium alloy. The linear coefficient of expansion of a titanium alloy is about $0.9\times10^{-50}$ $C^{-1}$, which is lower than half value of the above-mentioned metal group. In this sense, research and development into injection joining conducted by the inventors were put aside but it seemed to be very likely that success would be possible if the temperature range for use were narrower, so research and development into titanium alloys were conducted. If it could be confirmed that injection joining was possible with titanium alloys according to the above-mentioned hypothesis of the inventors, then this would prove that the hypothesis is correct.

The specific gravity of a titanium alloy is about 4.5, which is about 60% that of iron (specific gravity of 7.9), but titanium alloys are on a par with iron and iron alloys in terms of hardness and strength and are used as high-strength, lightweight metals. Titanium alloys also resist chlorine ions, as in case of salt water or sea water, and have exceedingly good corrosion resistance in outdoor applications. Therefore, titanium alloy parts are frequently used in various mobile electronic equipment, medical instruments, automotive mounted equipments, automobile parts, marine machineries, other such parts used in movable devices and particularly in the casings and housings of equipments that may be exposed to drops of salt water or sea water. The required mechanical fixing strength and durability can be ensured and, furthermore, when a hard resin is injected onto a titanium alloy, the production of these equipment casings is considered to be extremely easy. Moreover, titanium alloys do not irritate skin or body. These alloys are therefore known to be extremely important as metals that are accepted by body and are used for prosthetic legs and hands, for example.

Let us review the conditions important for the injection joining of metals and resins by summing the hypothesis by the inventors. Specifically, to obtain good injection joining strength, it is necessary at least on the shaped metal side:

(1) that the surface have large bumps (roughness) obtained by chemical etching and that the period thereof be at least a few hundred nanometers, preferably at least 1 μm and even more preferably have a mean bump period of 1 to 10 μm;

(2) that the surface have an ultrafine textured face on the nanometer order so that it may be sufficiently hard and non-slip, that is, that the surface look coarse when viewed microscopically; and (3) that a high-hardness, crystalline resin can be used as the resin, while preferably a resin composition that has been improved so as to delay crystallization during quenching.

This hypothesis proved to hold true not only for magnesium alloys but also for copper and copper alloys. The coarse surface mentioned in (2) above is a level that can only be observed with an electron microscope and to put this more as a general rule, high injection joining strength can be obtained when the spacing period is 10 to 500 nm and the height and/or depth is at least 10 nm.

SUMMARY OF THE INVENTION

The present invention has been conceived in light of the technical background discussed above and achieves the following object.

It is an object of the present invention to provide a metal and resin composite, in which a resin is joined by injection joining to a piece of shaped titanium alloy and a high joint strength is obtained, as well as a method for manufacturing the composite.

It is another object of the present invention to provide a metal and resin composite, in which joinability is improved by injection joining between a shaped titanium alloy with its surface treated and a high-hardness crystalline resin composition, as well as a method for manufacturing the composite.

The present invention employs the following means to achieve the stated object. Specifically, the composite of metal and resin according to the present invention 1 is composed of:

a titanium alloy substrate that has been machined into a specific shape and then chemically etched so as to have an ultrafine textured face in which bent, ridge-like protrusions having a width and height of from ten to a few hundred nanometers and a length of from a few to a few hundred microns rise up on the surface at a spacing period of from ten to a few hundred nanometers and so as to have a surface in which a surface roughness with a mean width of profile elements (RSm) of 1 to 10 μm and a maximum height of roughness (Rz) of 0.5 to 5 μm is observed; and a first resin composition whose main component is a polyphenylene sulfide resin or a second resin composition whose main component is a polybutylene terephthalate resin, which is directly joined by injection molding to the titanium alloy substrate.

The composite of metal and resin according to the present invention 2 is composed of:

a titanium alloy substrate that has been machined into a specific shape and then chemically etched so as to have a surface in which a surface roughness with a mean width of profile elements (RSm) of 1 to 10 μm and a maximum height of roughness (Rz) of 0.5 to 5 μm is observed and so as to have a ultrafine textured face in which are observed both smooth dome-like shapes and dead leaf-like shapes within a surface area measuring 10 μm square; and a first resin composition whose main component is a polyphenylene sulfide resin or a second resin composition whose main component is a polybutylene terephthalate resin, which is directly joined by injection molding to the titanium alloy substrate.

The method for manufacturing a composite of metal and resin according to the present invention 10 comprises:

a shaping step of shaping a titanium alloy substrate by mechanical working;

a surface treatment step including chemical etching for providing the surface of said shaped substrate with a ultrafine textured face in which protrusions with a height, width and length of at least 10 nm rise up at a spacing period of at least 10 nm in observation with an electron microscope and which a surface roughness made up of the textured face with a maximum height of roughness of 0.5 to 5 μm at a period of 1 to 10 μm;

an insertion step of inserting said substrate that has undergone said surface treatment including chemical etching into a metallic mold for injection molding; and an integrating step of injecting a first resin composition or a second resin composition onto said inserted substrate and integrating said substrate with said first resin composition or said second resin composition, said first resin composition being one in which a polyphenylene sulfide resin is the main component and a polyolefin resin is an auxiliary component, and said second resin composition being one in which a polybutylene terephthalate resin is the main component and a polyethylene terephthalate resin and/or a polyolefin resin is an auxiliary component.

The method for manufacturing a composite of metal and resin of present invention 11 comprises:
a shaping step of shaping a titanium alloy substrate by mechanical working;

a surface treatment step including chemical etching for providing the surface of said shaped substrate with a ultrafine textured face in which are observed both smooth dome-like shapes and dead leaf-like shapes within a surface area measuring 10 μm square and which a surface roughness with mean width of profile elements (RSm) of 1 to 10 μm and maximum height of roughness (Rz) of 1 to 5 μm in observation with a scanning probe microscope;

an insertion step inserting said substrate that has undergone said surface treatment including chemical etching into an metallic mold for injection molding; and an integrating step of injecting a first resin composition or a second resin composition onto said inserted substrate and integrating said substrate with said first resin composition or said second resin composition, said first resin composition being one in which a polyphenylene sulfide resin is the main component and a polyolefin resin is an auxiliary component, and said second resin composition being one in which a polybutylene terephthalate resin is the main component and a polyethylene terephthalate resin and/or a polyolefin resin is an auxiliary component.

The method for manufacturing a composite of metal and resin of present invention 12 comprises:
a shaping step of shaping a titanium alloy substrate by mechanical working;

a chemical etching step of immersing said shaped substrate in an aqueous solution containing ammonium monohydrodifluoride and rinsing the same with water;

an insertion step of inserting said chemically etched substrate into a metallic mold for injection molding; and an integration step of injecting a first resin composition or a second resin composition onto said inserted substrate and integrating said substrate with said first resin composition or said second resin composition, said first resin composition being one in which a polyphenylene sulfide resin is the main component and a polyolefin resin is an auxiliary component, and said second resin composition being one in which a polybutylene terephthalate resin is the main component and a polyethylene terephthalate resin and/or a polyolefin resin is an auxiliary component.

Surface roughness can be automatically measured using, for example, a scanning probe microscope. Surface roughness refers to the surface profile and can be displayed by a roughness profile, which is one of the curves representing the surface profile. This roughness profile is defined by the mean width of the profile elements (RSm) and the maximum height of roughness profile (Rz). These numerical values are specified by the Japan Industrial Standard (JIS B 0601: 2001). This Japan Industrial Standard (JIS B 0601: 2001) was produced in such a manner that ISO 4287 issued in 1997 was translated into Japanese without changing the technical content or specification table format. The above-mentioned ultrafine textured face was measured by observation with an electron microscope in magnification of 100,000 times. Further, the ultrafine textured shape, in which both the dome-like shapes and dead leaf-like shapes were seen, was observed within a surface area measuring 10 μm square with an electron microscope in magnification of 10,000 times.

[Applicable Industrial Field]

Applying the present invention in various fields affords better joinability, higher efficiency, an expanded range of application and so forth and makes possible the rationalization of manufacturing and the enhancement of corrosion resistance in the cases of electronic equipments and consumer electrical equipments. As a result, the present invention can contribute to better productivity and performance for casings and parts used in mobile electronic equipments, mounted electrical and electronic equipments, marine-use electrical and electronic equipments and in many other industrial fields.

[Effectiveness]

As explained in detail above, with the composite according to the present invention, a resin composition part and a titanium alloy part are integrated so that they may not readily come apart. A thermoplastic resin composition having a resin component containing PBT by 70 to 97 wt % and PET and/or polyolefin resin by 3 to 30 wt % or a thermoplastic resin composition having a resin component containing PPS by 70 to 97 wt % and polyolefin resin by 3 to 30 wt % can be securely joined by injection joining to a titanium alloy substrate that has undergone a specific surface treatment and, as a result, a composite can be manufactured in which a resin and a titanium alloy are integrated. Moreover, the method for manufacturing the composite is based on the joining technology to which the injection molding technology with good productivity is applied and the productivity of parts and casings in which titanium alloys are used can be improved with this method.

DETAILED DESCRIPTION OF THE PREFERRED EMBODIMENTS

The various elements that make up the present invention will now be described in detail.

[Titanium Alloy]

The substrate used in the present invention refers to the product of machining a titanium alloy into a specific shape. Titanium alloys include pure titanium of the type 1 to type 4 set forth in the Japan Industrial Standard (JIS), α type alloys, β type alloys, α-β type alloys and so forth and all of these can serve as the substrate in the present invention. In the present invention, the term "titanium alloy" encompasses what is known as "pure titanium," as well as all of its alloys. For example, pure titanium of type 1 and type 2 as set forth in the Japan Industrial Standards (JIS) contain iron by 0.05 to 0.1% and these are also called pure titanium-based titanium alloys.

[Surface Treatment of Titanium Alloy]

The surface of the titanium alloy substrate in the present invention is covered with a thin film that is thicker than a natural oxidized film. Chemical etching is needed to form this cover film, while it is even better to cover the surface with a ceramic. Titanium oxide is a specific example preferable for this ceramic. The treatment to which the alloys are subjected usually consists of three steps, namely, "a. degreasing", "b. chemical etching", and "c. surface hardening" so as to be in line with the hypothesis of the inventors proposed in relation to injection joining, where for a titanium alloy, just two steps may be used, namely, "a. degreasing" and "b. chemical etching". These steps will hereinafter be referred to as surface treatment concerning with the present invention.

Working oil used in machining, fingerprints and so forth generally adhere to a titanium alloy part that has undergone machining or the like, so the above-mentioned "a. degreasing step" is performed as a treatment step of immersing the part in an aqueous solution that contains a surfactant and then rinsing with water to remove such oil. An aqueous solution in which a neutralizer is dissolved can be used and it is preferable to use a commercially available degreaser for iron, steel or aluminum alloys. If a degreaser for titanium is commercially available, the inventors believe that these commercially available degreasers can also be used. The inventors just used an aluminum alloy degreaser (which usually contain a surfactant and a small amount of a basic agent), the details of which will be given in the working examples. Specifically, a commercially available aluminum alloy degreaser was adjusted to the concentration and temperature indicated by the manufacturer (such as a concentration of about 7.5% and a solution temperature of about 60° C.), the titanium alloy part was immersed for 5 to 10 minutes and then was rinsed with water. Shortly speaking, the degreaser used in this degreasing step does not need to be a special kind but any commercially available, ordinary degreaser may be used.

In the next, "b. chemical etching" is performed. A titanium alloy can be corroded by a reductive acid and, if the suitable type of acid is chosen, the entire surface can be corroded. Specifically, it is known that the entire surface can be corroded by a high concentration of a halogen acid, sulfuric acid or a high-temperature phosphoric acid aqueous solution. It has also been reported in the catalog of a titanium manufacturer that entire surface corrosion is achieved with an aqueous solution of oxalic acid, which is an organic substance. An aqueous solution that can bring about such entire surface corrosion can be used as chemical etchant. However, there are many different types of titanium alloy as mentioned above, so the results were confirmed by actual trial and error. The easiest way was to use a hydrofluoric acid compound as an acid that can bring about entire surface corrosion even in the form of an aqueous solution that has been greatly diluted and is close to room temperature. However, if hydrofluoric acid should happen to touch the skin, it can penetrate and reach the bone, where it will cause intense pain, and is therefore dangerous and difficult to handle. In view of this, it is preferable to use ammonium monohydrodifluoride, which has an adequate etching effect while still being fairly safe to the human body. More specifically, it is preferable to use an aqueous solution of ammonium monohydrodifluoride with a concentration of a few percent and a temperature of 50 to 70° C.

With the pure titanium alloys of type 1 and type 2 set forth in the Japan Industrial Standards (JIS), favorable chemical etching was achieved by immersing for a few minutes in the above-mentioned aqueous solution and then rinsing with water. The reaction here is the oxidation of the titanium metal into titanium oxide, with the water being reduced to generate hydrogen. The etching seems to have occurred in the course of the production of this titanium oxide. Assuming that the ammonium monohydrodifluoride is working mainly catalytically as mentioned above, then it is anticipated that the etching will begin at the metal crystal interface of the titanium, so the etching method has to be designed according to the size of the metal crystal grain size. When a commercially available titanium alloy is procured, it will be easier to finely adjust the etching process if the metal crystal grain size is known beforehand.

This chemical etching is usually followed by the "c. surface hardening treatment", where there may be cases in which bumps on the nanometer (nm) order are produced simultaneously on the very faces of the bumps on the micrometer (μm) order. An ultrafine textured face just happened to be produced on the titanium alloy surface that had been chemically etched with the above-mentioned hydrogen fluoride-based chemical. In such a case, the surface with ultrafine texture formed does not actually have to undergo the "c. surface hardening treatment", so long as the surface is formed with a hard, stable metal oxide layer.

Figure 3:
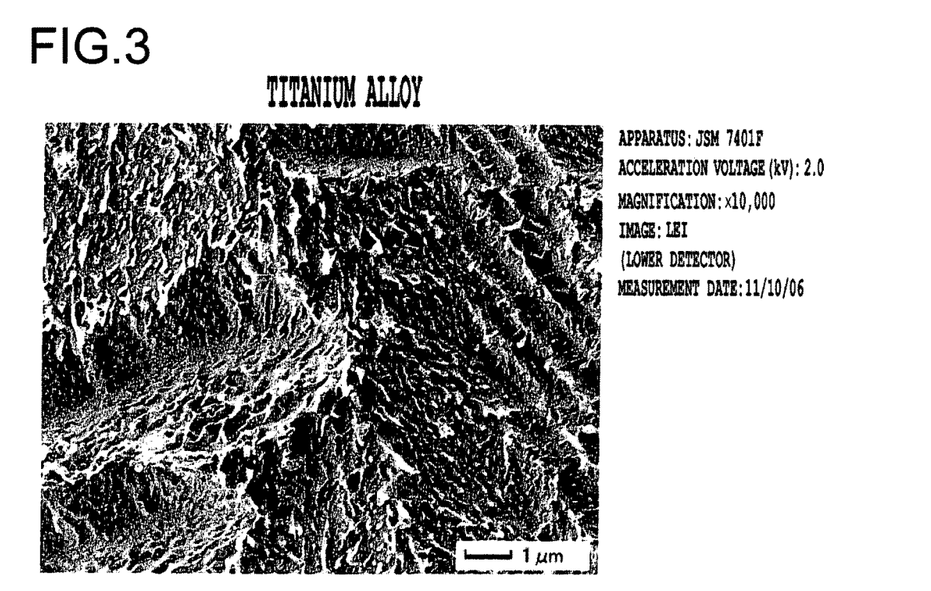
FIG. 3 is a photograph as a result of observation with an electron microscope in magnification of 10,000 times of a pure titanium-based titanium alloy piece that had been etched with an ammonium monohydrodifluoride aqueous solution, rinsed with water and dried.
Figure 4:
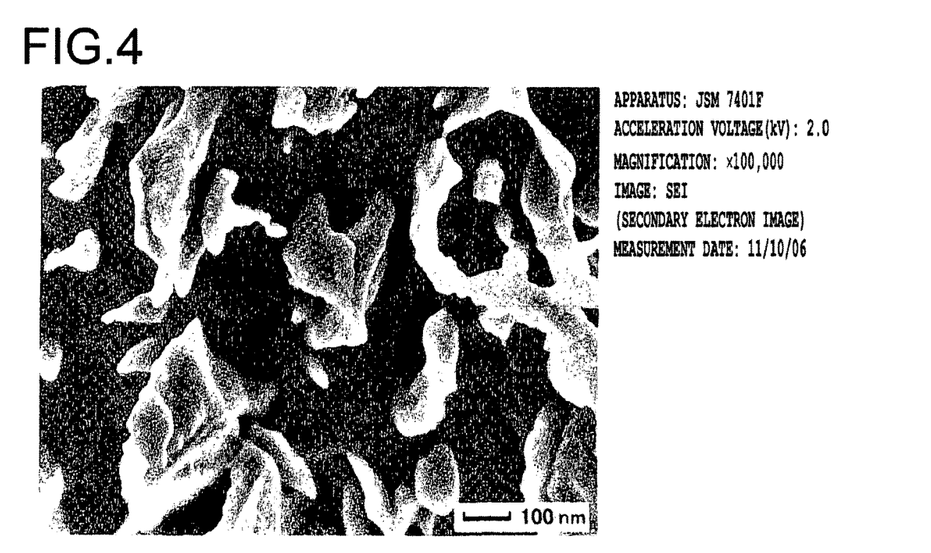
FIG. 4 is a photograph as a result of observation with an electron microscope in magnification of 100,000 times of a pure titanium-based titanium alloy piece that had been etched with an ammonium monohydrodifluoride aqueous solution, rinsed with water and dried.

The titanium alloy surface was dark brown in color after having been chemically etched with the ammonium monohydrodifluoride aqueous solution, rinsed with water and dried, where XPS analysis indicated that it was a titanium oxide surface. After degreasing, the titanium alloy had the same metallic gloss as before degreasing and the titanium alloy had obviously changed color after this chemical etching. This reveals that the resulting surface is not a natural oxidized film but rather a new titanium oxide. Oxide of titanium(IV) is colorless or white, while oxide of titanium (III) is dark purple, so this product seems to have been either a titanium oxide consisting of a mixture of trivalent and tetravalent titanium oxides or an alloy covered with thin layer mostly consisting of trivalent titanium oxide. FIGS. 3 and 4 are electron micrographs of the above-mentioned products obtained by degreasing and chemically etching a titanium alloy of type 1 (pure titanium) as set forth in the Japan Industrial Standards (JIS). Micron-order bumps can be seen in FIG. 3, while nanometer-order bumps, that is, a coarse texture, can be seen in FIG. 4.

Figure 5:
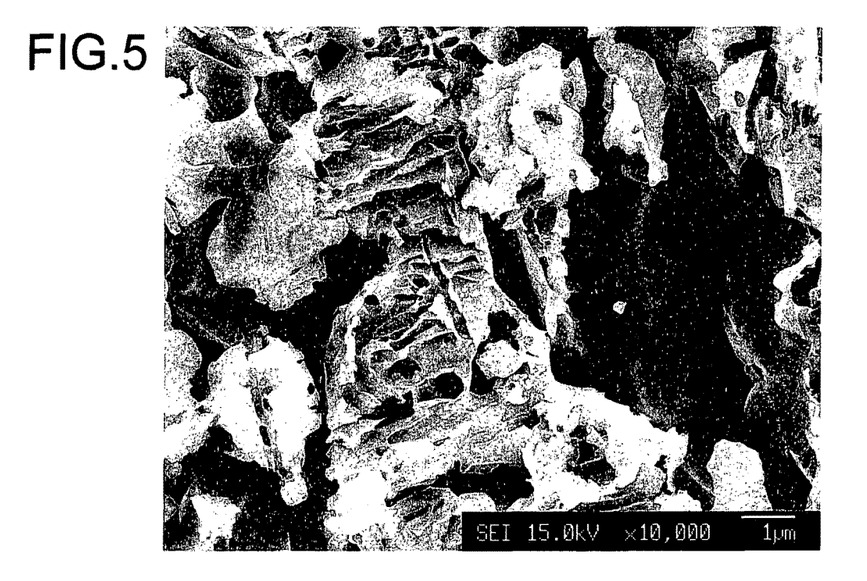
FIG. 5 is a photograph as a result of observation with an electron microscope in magnification of 10,000 times of an α-β type titanium alloy piece that had been etched with an ammonium monohydrodifluoride aqueous solution, rinsed with water and dried.
Figure 6:
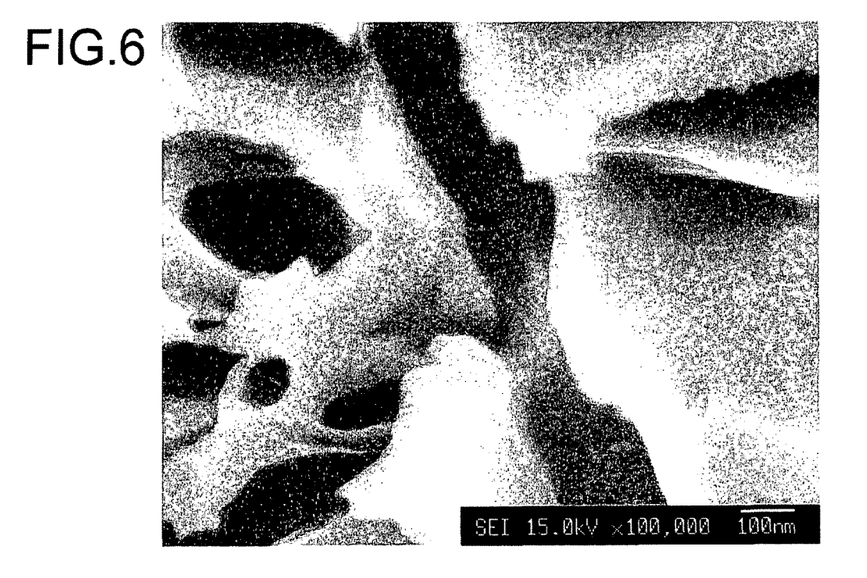
FIG. 6 is a photograph as a result of observation with an electron microscope in magnification of 100,000 times of an α-β type titanium alloy piece that had been etched with an ammonium monohydrodifluoride aqueous solution, rinsed with water and dried.

Also, a titanium alloy of α-β type was chemically etched in a variety of ways and as a result the surface configuration as viewed with an electron microscope was greatly different from the ultrafine textured face expected from the general theory proposed by the inventors. FIGS. 5 and 6 show electron micrographs in magnification of 10,000 times and 100,000 times respectively and, as can be seen in micrograph in magnification of 10,000 times, this is a strange surface in which "both smooth dome-like shapes and dead leaf-like shapes are observed" (in observation of a square that measures 10 μm on each side). When the surface was viewed in a low magnification, these two types of surfaces (domes and dead leaves) coexisted in a sufficiently blended state. When it comes to injection joining, it seems that dome-like surfaces probably do not play a part while the dead leaf-like surfaces afford somewhat better grip and serve as effective spikes. For roughness measured by scanning probe microscope, the range in which excellent joint strength was exhibited in injection joining shifted towards somewhat larger side for the maximum height of roughness (Rz). Here, RSm was in the same range of 1 to 10 μm and Rz was 0.5 to 10 μm as one-half of RSm, where preferably Rz would be 1 to 5 μm.

The importance of using chemical etching will be described here. Any method can be used as long as the anticipated surface configuration discussed above is obtained but the question occurs as to why chemical etching is required. This is related to the situation where it is believed that the designed fine textured face can be achieved with one of the recent sophisticated ultrafine working methods in which the material is coated with a photochemical resist and visible light rays or ultraviolet rays are used. However, there are some reasons why chemical etching is particularly favorable for injection joining other than simplicity of operation entailed. Specifically, if the chemical etching is carried out under the right conditions, not only will the appropriate bump period and the appropriate recess depth be obtained but the fine shape of the resulting recesses will not be simple and most of the recesses will have an undercut structure. An undercut structure means that there are places that cannot be seen inside the recesses when the recesses are viewed from above and, if we could look at these microscopically from the bottom of the recess, overhanging places would be seen. It should be easily understood that undercut structures are necessary for injection joining.

[Resin Composition]

The resin composition used in the present invention refers to a first resin composition whose main component is a polyphenylene sulfide resin or a second resin composition whose main component is a polybutylene terephthalate resin, both of the resin composition being crystalline resins and directly joined to the above-mentioned titanium alloy substrate. The resin component of this first resin composition is a resin composition in which a polyphenylene sulfide resin is the main component and a polyolefin resin is an auxiliary component. The resin component of the second resin composition is a resin composition in which the polybutylene terephthalate resin is the main component and a polyethylene terephthalate resin and/or a polyolefin resin is an auxiliary component.

The first resin composition preferably contain the above-mentioned polyphenylene sulfide resin by 70 to 97 wt % and the above-mentioned polyolefin resin by 3 to 30 wt %. The second resin composition preferably contain the above-mentioned polybutylene terephthalate resin by 70 to 97 wt % and the above-mentioned polyethylene terephthalate resin and/or polyolefin resin by 3 to 30 wt %. If different types of resin are thus mixed at the molecular level, it is surmised that even when the crystallization temperature is reached, the same types will not join together abruptly and generation of microcrystallization or growth of crystals will be delayed by a very short time.

A high-hardness, crystalline resin composition that is used as the resin composition is preferably PPS or PBT containing at least one type of filler selected from among glass fiber, carbon fiber, aramid fiber, other such reinforcing fiber, calcium carbonate, magnesium carbonate, silica, talc, clay and glass powder, in an amount of 20 to 60 wt % of the total composition. This is because adding these fillers allows the linear coefficient of expansion of the molded resin to be adjusted to 2 to $3 \times 10^{-50}$ $C^{-1}$ and kept as low as possible.

[Resin Composition/PPS]

The PPS resin composition will now be discussed. When the resin component is composed of PPS by 70 to 97% and polyolefin resin by 3 to 30%, a composite with particularly good joint strength can be obtained. If the polyolefin resin content is less than 3%, the effect of adding the polyolefin resin on enhancing injection joining strength will not be reliable. Meanwhile, the same applies when the polyolefin resin content is more than 30%. With a PPS resin to which more than 30% polyolefin resin has been added, the pyrolysis of the polyolefin resin in the injection barrel of the injection molding machine will result in an abnormally large amount of gas being generated, which can hinder even the injection molding itself.

Any PPS can be used as long as it is classified as PPS, while one with a melt viscosity of 100 to 30,000 poise as measured at a temperature of 315° C. and a load of 98 N (10 kgf) with a Koka type flow tester mounted with a die 1 mm in diameter and 2 mm long is preferable because it will have better moldability and workability when formed into a resin composition part. Also, the PPS may be one substituted with amino groups, carboxyl groups or the like or may be one copolymerized with trichlorobenzene or the like during polymerization.

Also, the PPS may be of a linear structure or may have some branched structure within it and may have undergone heat treatment in an inert gas, etc. Furthermore, the ions, oligomers or other such impurities in the PPS may have been reduced by performing a deionization treatment (acid washing, hot water washing, etc.) or washing treatment with an organic solvent such as acetone before or after heating and curing, while its curing may have been promoted by performing a heat treatment in an oxidative gas upon completion of the polymerization reaction.

The polyolefin resin is an ethylene resin, propylene resin or other such material normally known as a polyolefin resin and may be a commercially available product. Of these, maleic anhydride-modified ethylene copolymers, glycidyl methacrylate-modified ethylene copolymers, glycidyl ether-modified ethylene copolymers, ethylene alkyl acrylate copolymers or the like are preferable because a composite with particularly excellent bondability can be obtained.

Examples of maleic anhydride-modified ethylene copolymers include maleic anhydride graft-modified ethylene copolymers, maleic anhydride-ethylene copolymers and ethylene-acrylic acid ester-maleic anhydride ternary copolymers, of which an ethylene-acrylic acid ester-maleic anhydride ternary copolymer is preferable because a particularly excellent composite is obtained. A specific example of an ethylene-acrylic acid ester-maleic anhydride ternary copolymer is Bondine (made by Arkema).

Examples of glycidyl methacrylate-modified ethylene copolymers include glycidyl methacrylate graft-modified ethylene copolymers and glycidyl methacrylate-ethylene copolymers, of which a glycidyl methacrylate-ethylene copolymer is preferable because a particularly excellent composite is obtained. A specific example of a glycidyl methacrylate-ethylene copolymer is Bondfast (made by Sumitomo Chemical). Examples of glycidyl ether-modified ethylene copolymers include glycidyl ether graft-modified ethylene copolymers and glycidyl ether-ethylene copolymers and a specific example of an ethylene alkyl acrylate copolymer is Lotryl (made by Arkema).

With the composite in the present invention, the resin composition part preferably contains polyfunctional isocyanate compound by 0.1 to 6 weight parts and/or epoxy resin by 1 to 25 parts per 100 weight parts of the total resin component including PPS by 70 to 97 wt % and polyolefin resin by 3 to 30 wt %, because the joining of the shaped titanium alloy and the resin composition part will be better. A commercially available non-blocked or blocked polyfunctional isocyanate compound can be used.

Examples of polyfunctional non-blocked isocyanate compounds include 4,4'-diphenylmethane diisocyanate, 4,4'-diphenylpropane diisocyanate, toluene diisocyanate, phenylene diisocyanate and bis(4-isocyanate phenyl)sulfone. A polyfunctional blocked isocyanate compound has two or more isocyanate groups per molecule, where these isocyanate groups reacted with a volatile active hydrogen compound, making the material inert at normal temperature. There are no particular restrictions on the type of polyfunctional blocked isocyanate compound but generally it will have a structure in which the isocyanate groups are masked by a blocking agent such as an alcohol, a phenol, $\epsilon$-caprolactam, an oxime or an active methylene compound.

An example of a polyfunctional blocked isocyanate is Takenate (made by Mitsui Takeda Chemical). The epoxy resin can be any commonly known type such as a bisphenol A type or a cresol novolac type. An example of a bisphenol A type is Epikote (made by Japan Epoxy Resin), while an example of a cresol novolac type is Epiclon (made by Dainippon Ink & Chemicals).

[Resin Composition/PBT]

The PBT resin composition will now be discussed. Preferably, the resin composition will include not just the above-mentioned filler but also PET and/or polyolefin resin by 3 to 30 wt % and PBT by 70 to 97 wt %. Injection joining strength is superior with a PBT resin composition in which PBT is the main component and PET and/or a polyolefin resin is an auxiliary component. The same polyolefin resins as those listed for the PPS resin composition can be used. Joint strength will be highest when the PET and/or polyolefin resin accounts for 5 to 20 wt %, while the joint strength will still not be significantly lowered at 3 to 5 wt % or at 20 to 30 wt %. However, if the amount is more than 30 wt %, the effect on injection joining strength will be diminished and, if the PET component is over 25 wt %, an ester interchange reaction with PBT will be more likely to proceed at the high temperatures in the injection molding machine, so there is the risk that the strength of the resin itself will be lowered. Also, if the polyolefin resin component is over 30 wt %, more gas will be generated and moldability will tend to be worsened.

[Manufacturing of Composite/Injection Joining]

The method for manufacturing a composite according to the present invention is an injection joining method in which a metal part is inserted and is performed as follows. A metallic mold for injection molding is made ready, the mold is opened, a shaped titanium alloy obtained by the above-mentioned treatment is inserted into one half of the mold, the mold is closed and a PPS- or PBT-based thermoplastic resin composition is injected and solidified, after which the mold is opened and the product removed, thus a composite being manufactured. The injection conditions will now be described. The mold temperature is preferably at least 100° C., more preferably at least 120° C., for a PBT resin or PPS resin, because there will be little effect on resin strength after solidification and composite production efficiency will be made better. The injection temperature, injection pressure and injection rate are not much different from those of ordinary injection molding but, if pressed to say, the injection rate and injection pressure are better on the high side.

Embodiments of the present invention will now be described through working examples.

Figure 1:
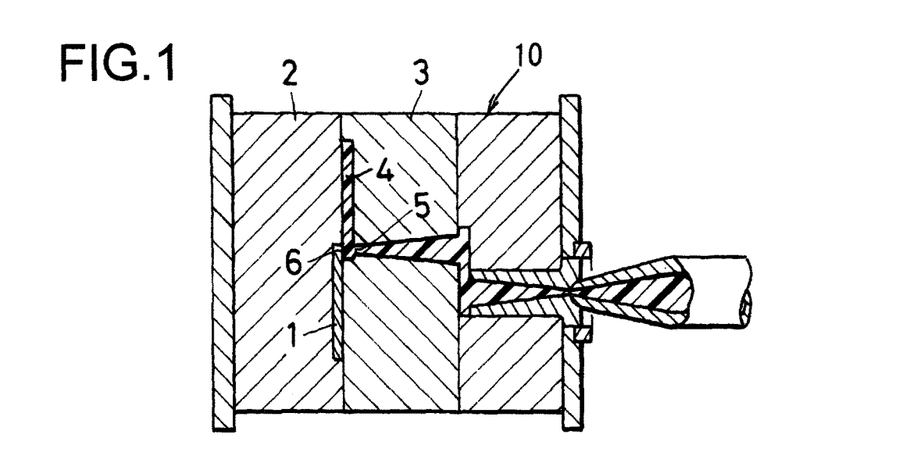
FIG. 1 is a cross sectional view schematically illustrating a metallic mold for manufacturing a composite of metal and resin (a titanium alloy substrate and a resin composition)
Figure 2:
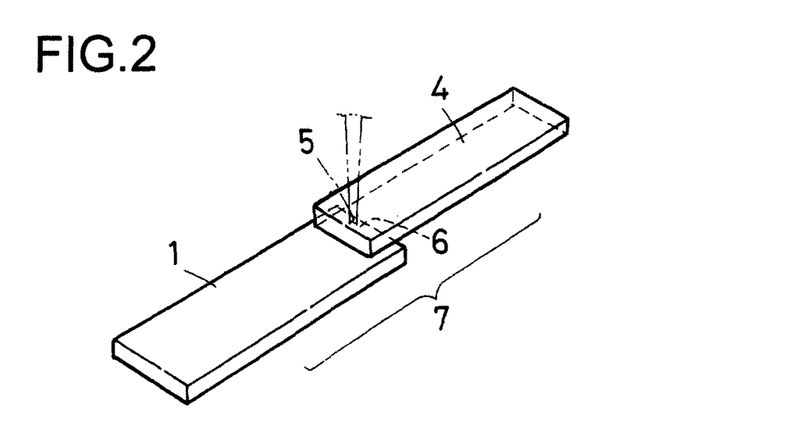
FIG. 2 is an exterior view schematically illustrating a composite of metal and resin (a titanium alloy substrate and a resin composition)

FIGS. 1 and 2 are to be referred to in common for various working examples, where FIG. 1 is a cross sectional view schematically illustrating a metallic mold for injection molding 10 used in the working examples. The figure shows a state in which the metallic mold for injection molding 10 has been closed and injection molding is being performed. FIG. 2 is an exterior view schematically illustrating a composite 7 of a metal and a resin formed in the metallic mold for injection molding 10. This mold for injection molding 10 is made up of a movable mold plate 2 and a stationary mold plate 3 and a resin injector comprising a pinpoint gate 5, a runner, and so forth is constituted on the stationary mold plate 3 side.

The formation of the composite 7 is carried out as follows. First, the movable mold plate 2 is opened and a titanium alloy piece 1 which is a substrate composed of a titanium alloy is inserted into the cavity formed between the movable mold plate 2 and the stationary mold plate 3. After this insertion, the movable mold plate 2 is closed, resulting in the state before injection. A molten resin composition 4 is then injected through the pinpoint gate 5 into the cavity in which the titanium alloy piece 1 was inserted.

After being injected, the resin composition 4 is mated to the titanium alloy piece 1, fills the cavity that is not occupied by the titanium alloy piece 1 and is molded, thereby a composite 7, in which the titanium alloy piece 1 and the resin composition 4 (metal and resin) are integrated, is obtained. The composite 7 has a joining face 6 between the titanium alloy piece 1 and the resin composition 4 and the surface area of this joining face 6 is 5 mm×10 mm. Specifically, the surface area of the joining face 6 is 0.5 cm². In the following working examples, strength test is conducted using the same surface area of the joining face. Strength is obtained under the same conditions in the comparative examples given below, as well.

Working examples of the present invention will now be described in detail.

First, the methods for evaluating and measuring the composites obtained in the following working examples will be described.

(a) Measurement of Melt Viscosity

The melt viscosity of thermoplastic resin was measured with a Koka-type flow tester (CFT-500, made by Shimadzu, Kyoto, Japan) equipped with die having a diameter of 1 mm and a length of 2 mm, at a measurement temperature of 315° C. and a load of 98 N (10 kgf).

(b) X-ray Photoelectron Analyzer (XPS Observation)

Surface observation method involved the use of photoelectron analyzer (XPS observation) that analyzes the energy of photoelectrons emitted from the sample upon irradiation of the same with X-rays and performs qualitative analysis of elements or the like. This photoelectron analyzer was an Axis-Nova (product name; made by Kratos Analytical: England and Shimadzu: Japan), which is a model that allows a surface only a few microns in diameter to be observed to a depth of a few nanometers.

(c) Electron Beam Microanalyzer (EPMA Observation)

EPMA was mainly used to observe the interior of the substrate. Elements contained down to a depth of about 1 μm from the surface could be detected. Observation was conducted at 15 kV with an EPMA-1600 (trade name; made by Shimadzu).

(d) Electron Microscopy

Electron microscopes were mainly used to observe the substrate surface. These electron microscopes were a scanning electron microscope (SEM) S-4800 (product name; made by Hitachi, Tokyo, Japan) and JSM-6700F (product name; made by JEOL, Tokyo, Japan), where observations were made at 1 to 2 kV. The magnification was 10,000 times and 100,000 times, and photographs were taken with scales of 1 μm and 100 nm recorded within.

(e) Scanning Probe Microscopy

A scanning probe microscope was used mainly to observe substrate surfaces. This microscope is a scanning probe microscope in which a probe with a pointed tip is used so that it may be moved scanning the surface of substance and the surface condition is enlarged for observation. This scanning probe microscope was an SPM-9600 (product name; made by Shimadzu, Kyoto, Japan).

(f) Measurement of Composite Joining Strength

Tensile stress was measured by pulling the composite 7 in a tensile tester to impart shearing force and the breaking force at break was termed the shear stress. This tensile tester was a Model 1323 (product name; made by Aikoh Engineering, Tokyo, Japan) and the shearing force was measured at a pulling rate of 10 mm/minute.

In the next, the preparation examples of resin compositions will be described.

Preparation Example 1 (PPS Composition Preparation Example)

6214 g of $Na_2S.2.9H_2O$ and 17,000 g of N-methyl-2-pyrrolidone were supplied to a 50 liter autoclave equipped with a stirrer. The temperature was gradually raised to 205° C. while stirring the system under a nitrogen gas flow and 1355 g of water was distilled off. This system was cooled to 140° C., after which 7160 g of p-dichlorobenzene and 5000 g of N-methyl-2-pyrrolidone were added and the system was sealed under a nitrogen gas flow. The temperature of the system was raised to 225° C. over 2 hours, the system was polymerized for 2 hours at 225° C., then the temperature was raised to 250° C. over 30 minutes and polymerization was conducted for another 3 hours at 250° C. Upon completion of the polymerization, the system was cooled to room temperature and the polymer was separated in a centrifuge. The solids of the polymer were repeatedly washed with warm water and dried over night at 100° C., which gave PPS with a melt viscosity of 280 poise (hereinafter referred to as PPS (1)).

This PPS (1) was cured for 3 hours at 250° C. under a nitrogen atmosphere to obtain PPS (hereinafter referred to as PPS (2)). The melt viscosity of the resulting PPS (2) was 400 poise. 6.0 kg of the resulting PPS (2), 1.5 kg of ethylene-acrylic ester-maleic anhydride ternary copolymer (Bondine TX8030, made by Arkema) and 0.5 kg of epoxy resin (Epicote 1004, made by Japan Epoxy Resin) were uniformly mixed preliminarily in a tumbler. After this, glass fiber with an average fiber diameter of 9 μm and a fiber length of 3 mm (RES03-TP91, made by Nippon Sheet Glass) was supplied by side feeder so that the added amount would be 20 wt % while being melt-kneaded in a biaxial extruder (TEM-35B, made by Toshiba Machine) at a cylinder temperature of 300° C., which gave a pelletized PPS composition (1). The resulting PPS composition (1) was dried for 5 hours at 175° C.

Preparation Example 2 (Preparation of PPS Composition)

The PPS (1) obtained in Preparation Example 1 was cured for 3 hours at 250° C. under an oxygen atmosphere, which gave PPS (hereinafter referred to as PPS (3)). The resulting PPS (3) had a melt viscosity of 1800 poise. 5.98 kg of the resulting PPS (3) and 0.02 kg of polyethylene (Nipolon Hard 8300A, made by Tosoh) were uniformly mixed preliminarily in a tumbler. After this, glass fiber with an average fiber diameter of 9 μm and a fiber length of 3 mm (RES03-TP91) was supplied by side feeder so that the added amount would be 40 wt % while these were melt-kneaded in a biaxial extruder (TEM-35B) at a cylinder temperature of 300° C., which gave a pelletized PPS composition (2). The resulting PPS composition (2) was dried for 5 hours at 175° C.

Preparation Example 3 (Preparation of PPS Composition)

7.2 kg of the PPS (2) obtained in Preparation Example 1 and 0.8 kg of glycidyl methacrylate-ethylene copolymer (Bondfast E, made by Sumitomo Chemical) were uniformly mixed preliminarily in a tumbler. After this, glass fiber with an average fiber diameter of 9 μm and a fiber length of 3 mm (RES03-TP91) was supplied by side feeder so that the added amount would be 20 wt % while these were melt-kneaded in a biaxial extruder (TEM-35B) at a cylinder temperature of 300° C., which gave a pelletized PPS composition (3). The resulting PPS composition (3) was dried for 5 hours at 175° C.

Preparation Example 4 (Preparation of PPS Composition)

4.0 kg of the PPS (2) obtained in Preparation Example 1 and 4.0 kg of ethylene-acrylic ester-maleic anhydride ternary copolymer (Bondine TX8030, made by Arkema) were uniformly mixed preliminarily in a tumbler. After this, glass fiber with an average fiber diameter of 9 μm and a fiber length of 3 mm (RES03-TP91) was supplied by side feeder ao that the added amount would be of 20 wt % while these were melt-kneaded in a biaxial extruder (TEM-35B) at a cylinder temperature of 300° C., which gave a pelletized PPS composition (4). The resulting PPS composition (4) was dried for 5 hours at 175° C.

Preparation Example 5 (Preparation of PBT Composition)

4.5 kg of PBT resin (Toraycon 1100S, made by Toray) and 0.5 kg of PET resin (TR-4550BH, made by Teijin Kasei) were uniformly mixed in a tumbler. After this, glass fiber with an average fiber diameter of 9 μm and a fiber length of 3 mm (RES03-TP91) was supplied by side feeder so that the added amount would be 30 wt % while these were melt-kneaded in a biaxial extruder (TEM-35B) at a cylinder temperature of 270° C., which gave a pelletized PBT resin composition. This was dried for 3 hours at 140° C. to obtain a PBT composition (1).

Preparation Example 6 (Preparation of PBT Composition)

6.0 kg of PBT resin (Toraycon 1401×31, made by Toray), 0.7 kg of ethylene-acrylic ester-maleic anhydride ternary copolymer (Bondine TX8030, made by Arkema) and 0.15 kg of epoxy resin (Epicote 1004, made by Japan Epoxy Resin) were uniformly mixed preliminarily in a tumbler. After this, glass fiber with an average fiber diameter of 9 μm and a fiber length of 3 mm (RES03-TP91, made by Nippon Sheet Glass) was supplied by side feeder so that the added amount would be 30 wt % while being melt-kneaded in a biaxial extruder (TEM-35B, made by Toshiba Machine) at a cylinder temperature of 270° C., which gave a pelletized PBT composition (2). The resulting PBT composition (2) was dried for 5 hours at 150° C.

Preparation Example 7 (Preparation of PBT Composition)

6.0 kg of PBT resin (Toraycon 1401×31, made by Toray), 0.5 kg of PET resin (TR-4550BH, made by Teijin Kasei), 0.5 kg of ethylene-acrylic ester-maleic anhydride ternary copolymer (Bondine TX8030, made by Arkema) and 0.1 kg of epoxy resin (Epicote 1004, made by Japan Epoxy Resin) were uniformly mixed preliminarily in a tumbler. After this, glass fiber with an average fiber diameter of 9 μm and a fiber length of 3 mm (RES03-TP91, made by Nippon Sheet Glass) was supplied by side feeder so that the added amount would be 30 wt % while these were melt-kneaded in a biaxial extruder (TEM-35B, made by Toshiba Machine) at a cylinder temperature of 270° C., which gave a pelletized PBT composition (3). The resulting PBT composition (3) was dried for 5 hours at 150° C.

Working and comparative examples of composites will now be further described.

Working Example 1

Commercially available KS-40 (made by Kobe Steel) sheeting, which is a pure titanium-based type 1 titanium alloy under the Japan Industrial Standards (JIS) and which has a thickness of 1.0 mm, was purchased and cut into numerous rectangular pieces measuring 18 mm×45 mm to obtain titanium alloy pieces (titanium alloy substrates). A hole was formed to pass through the end of each titanium alloy piece, a copper wire coated with polyvinyl chloride was passed through the holes of a dozen or so pieces and the copper wire was bent so that the titanium alloy pieces would not overlap each other, thus allowing all pieces to be hung up at the same time. An aqueous solution containing aluminum alloy degreaser (NE-6, made by Meltex) by 7.5% was adjusted to 60° C. and made ready in a tank, the above-mentioned titanium alloy pieces were immersed for 5 minutes and rinsed with tap water (Ota City, Gunma, Japan).

In the next, an aqueous solution containing ammonium monohydrodifluoride by 1% and adjusted to 60° C. was made ready in another tank, the above-mentioned titanium alloy pieces were immersed for 2 minutes and then thoroughly rinsed with deionized water. They were then dried for 15 minutes in a warm air dryer set to 90° C. The surface was dark brown in color. The copper wire was taken out of the titanium alloy pieces placed on a clean aluminum foil, the pieces were wrapped up together, then put in a plastic bag, sealed and stored. In this work, no fingers touched the surfaces to be joined, that is, the end portions on the opposite side from where each hole was formed, to preserve the above-mentioned treated state.

Two days later, one of the pieces was cut and observed with an optical microscope, an electron microscope and a scanning probe microscope. The results of observation with the electron microscope are shown in FIGS. 3 and 4. The surface has a strange configuration of superfine texture in which bent, ridge-like protrusions having a width and height of 10 to 300 nm and a length of from 100 to a few thousand nanometers rise up on the surface at a spacing period of 10 to 300 nm. Meanwhile, in observation with a scanning probe microscope, a surface roughness was observed in which the mean value of RSm was 2 to 3 μm at a period of 0.5 to 5 μm and the maximum depth was about 3 μm. In observation with XPS, large amounts of oxygen, titanium and carbon were seen, while small amounts of nitrogen, calcium and the like were also noted. No metallic titanium was noted in the titanium but a tiny amount of titanium carbide was detected. A face that had been shaved (thinned) by approximately 100 nm by etching with argon ions was analyzed again with XPS and here again titanium, oxygen and carbon were detected in large amounts, while, for titanium atoms, considerable metallic titanium, titanium carbide and titanium nitride were detected, which revealed that the metal phase was also detected.

To put this in another way, the thickness of the titanium oxide layer was 50 to 100 nm, which was substantially thick. Also, the deeper going into the layer, the more the titanium ions (divalent to tetravalent) tend to decrease, so the surface layer contains more titanium dioxide, while dititanium trioxide and titanium monoxide as well as titanium nitride and titanium carbide that are close to Ti (zero valence) increase towards deeper layer, leading to the conclusion that this would eventually become a metallic titanium phase. Incidentally, when the KS-40 titanium alloy was analyzed by XPS immediately after purchase, this data was the same as the surface analysis result for the etched product. However, when this titanium alloy was shaved down by 100 nm with argon ions and the shaved surface was analyzed with XPS, a large amount of metallic titanium was detected. These results revealed that the titanium oxide layer on the titanium alloy surface is clearly thicker on the pieces etched, rinsed and dried by the inventors than on the pieces machined as sheeting.

Also, the above-mentioned XPS analysis results indicate that this might be a titanium dioxide (tetravalent Ti) single layer but, even if it is a titanium dioxide layer, it is extremely thin and is considered to be an oxide of mixed trivalent and tetravalent titaniums. This is because the titanium alloy after etching lost its metallic color and turned dark brown, while the dititanium trioxide, which is an oxide of trivalent titanium, was dark purple in color. Also, the ridge-like bumps seen in the electron micrograph of FIG. 4 may be mainly of titanium dioxide, and the foundation may be a mixed oxide layer. It is possible that the question could be answered by performing Auger electron analysis, which allows analysis of a narrow region measuring just a few nanometers but the inventors did not perform this.

Further one day later, the remaining titanium alloy pieces 1 were taken out. For each of the pieces, the portion with the hole formed was grasped with a glove so that no oil or the like might adhere and each piece was inserted into a metallic mold for injection molding 10. The metallic mold for injection molding 10 was closed and the PPS composition (1) obtained in Preparation Example 1 was injected at an injection temperature of 310° C. The mold temperature of the metallic mold for injection molding 10 was 140° C. and 20 of the integrated composites 7 shown in FIG. 2 were obtained. The size of the resin part was 10 mm×45 mm×5 mm and the joining face 6 measured 10 mm×5 mm (0.5 cm$^2$). The composites 7 were placed for 1 hour in a hot air dryer at the temperature of 170° C. on the day of molding to anneal them and then one day later they were subjected to tensile test, which revealed the average shear breaking strength to be 25 MPa.

Working Example 2

Other than using the PPS composition (2) obtained in Preparation Example 2 instead of the PPS composition (1) obtained in Preparation Example 1, titanium alloy pieces 1 were produced, injection molding was performed and composites 7 were obtained under exactly the same experimental conditions as in Working Example 1. The composites 7 thus obtained were annealed for 1 hour at 170° C. In short, in this experiment a PPS resin composition containing only PPS and a filler and containing only a tiny amount of polyolefin polymer was used. After one day, ten of the composites 7 were subjected to tensile test, which revealed the average shear breaking strength to be 8 MPa. This was far from Working Example 1 and the difference in the resin composition material used appeared in the result.

Working Example 3

Other than using the PPS composition (3) obtained in Preparation Example 3 instead of the PPS composition (1) obtained in Preparation Example 1, composites 7 were obtained by exactly the same method as in Working Example 1. The composites 7 were annealed for 1 hour at 170° C. on the day of molding. Two days later these composites 7 were measured for shear breaking strength with a tensile tester and the average was found to be 16.3 MPa.

Comparative Example 1

Other than using the PPS composition (4) obtained in Preparation Example 4 instead of the PPS composition (1), an attempt was made to obtain a composite by the same method as in Working Example 1. In short, in this experiment a PPS resin composition was used that contained a large amount of polyolefin polymer. However, a large quantity of gas was generated during molding and this caused the molding to be stopped. In this experiment the main component of the resin composition was not PPS.

Working Example 4

Other than using the PBT composition (1) obtained in Preparation Example 5 instead of the PPS composition (1) obtained in Preparation Example 1, titanium alloy pieces 1 were produced, injection molding was performed and composites 7 were obtained by exactly the same method as in Working Example 1. The injection temperature was 280° C., the mold temperature was 140° C. and the annealing conditions for the obtained composites 7 were 1 hour at 150° C. One day later, these composites 7 were subjected to tensile test, which revealed the shear breaking strength to be an average of 21 MPa for 10 pieces.

Working Example 5

Other than using the PBT composition (2) obtained in Preparation Example 6 instead of the PBT composition (1) obtained in Working Example 5, titanium alloy pieces 1 were produced, injection molding was performed and composites 7 were obtained by exactly the same method as in Working Example 5. The annealing conditions for the obtained composites 7 were also the same. One day later, these composites 7 were subjected to tensile test, which revealed the shear breaking strength to be an average of 19.6 MPa for 10 pieces.

Working Example 6

Other than using the PBT composition (3) obtained in Preparation Example 7 instead of the PBT composition (1) obtained in Preparation Example 5, titanium alloy pieces 1 were produced, injection molding was performed and composites 7 were obtained by exactly the same method as in Working Example 5. The annealing conditions for the obtained composites 7 were also the same. One day later, these composites 7 were subjected to tensile test, which revealed the shear breaking strength to be an average of 24.4 MPa for 10 pieces.

Working Example 7

Commercially available KS-40 (made by Kobe Steel; pure titanium-based type 1 titanium alloy of Japan Industrial Standards (JIS)) sheeting with a thickness of 1.0 mm was cut into rectangular pieces measuring 18×45 mm. A hole was formed to pass through the end of each of the titanium alloy pieces, a copper wire coated with polyvinyl chloride was passed through the holes of a dozen or so pieces and the copper wire was bent so that the titanium alloy pieces would not overlap each other, thus allowing all pieces to be hung up at the same time. An aqueous solution containing aluminum alloy degreaser (NE-6, made by Meltex) by 7.5% was adjusted to 60° C. and made ready in a tank, the titanium alloy pieces were immersed for 5 minutes and thoroughly rinsed with tap water (Ota City, Gunma, Japan).

In the next, an aqueous solution in which a multipurpose etchant containing ammonium monohydrodifluoride by 40% and adjusted to 60° C. (KA-3; made by the National Institute for Metalworking Skills, Sumida-ku, Tokyo) had been dissolved in an amount of 2 wt % was adjusted to 60° C. and made ready in another tank. The titanium alloy pieces were immersed in this for 3 minutes and then thoroughly rinsed with deionized water. They were then dried for 15 minutes in a warm air dryer set to 90° C. The surface was dark brown in color. The copper wire was taken out of the titanium alloy pieces placed on a clean aluminum foil, the pieces were wrapped up together, then put in a plastic bag, sealed and stored. In this work, no fingers touched the surfaces to be joined, that is, the end portion on the opposite side from where each hole was made.

Three days later the titanium alloy pieces 1 were taken out, the portion with a hole was grasped with a glove so that no oil or the like would adhere and each piece was inserted into a metallic mold for injection molding 10. The injection molding mold 10 was closed and the PPS composition (1) obtained in Preparation Example 1 was injected at an injection temperature of 310° C. The mold temperature was 140° C. and 20 of the integrated composites 7 shown in FIG. 2 were obtained. The size of the resin part was 10 mm×45 mm×5 mm and the joining face 6 measured 10 mm×5 mm (0.5 cm$^2$). The composites 7 were placed for 1 hour in a hot air dryer at the temperature of 170° C. on the day of molding to anneal them and then further one day later they were subjected to tensile test, which revealed the average shear breaking strength to be 26.5 MPa.

Working Example 8

Commercially available pure titanium-based type 2 titanium alloy sheeting TP340 with a thickness of 1.0 mm under Japan Industrial Standards (JIS) was purchased and cut into rectangular pieces measuring 18 mm×45 mm to obtain titanium alloy pieces as the titanium alloy substrates. After this, surface treatment was performed in exactly the same manner as in Working Example 1. Furthermore, the PPS composition (1) was used for injection joining in exactly the same manner as in Working Example 1. 20 composites 7 were obtained and placed for 1 hour in a hot air dryer at the temperature of 170° C. on the day of molding to anneal them and then one day later they were subjected to tensile test, which revealed the average shear breaking strength to be 26 MPa.

Working Example 9

Commercially available sheeting of α-β-type titanium alloy KSTi-9 with a thickness of 1.0 mm (made by Kobe Steel) was purchased and cut into numerous rectangular pieces measuring 18 mm×45 mm to obtain titanium alloy pieces as titanium alloy substrates. A hole was formed to pass through the end of each of the titanium alloy pieces, copper wire coated with polyvinyl chloride was passed through the holes of a dozen or so pieces and the copper wire was bent so that the titanium alloy pieces would not overlap each other, thus allowing all to be hung up at the same time. An aqueous solution containing aluminum alloy degreaser (NE-6, made by Meltex) by 7.5% was adjusted to 60° C. and made ready in a tank, the titanium alloy pieces were immersed for 5 minutes and rinsed with tap water (Ota City, Gunma, Japan).

In the next, an aqueous solution containing caustic soda by 1.5% and adjusted to 40° C. was made ready in a separate tank, the above-mentioned pieces were immersed for 1 minute and then thoroughly rinsed with water. Then, an aqueous solution containing a commercially available etchant KA-3 (made by the National Institute for Metal-working Skills; labeled as containing ammonium monohydrodifluoride by 40% and other by 60%) by 2% was adjusted to 60° C. and made ready in another tank, the above-mentioned titanium alloy pieces were immersed in this for 5 minutes and then thoroughly rinsed with deionized water. Then, an aqueous solution containing oxalic acid by 5% was adjusted to 40° C. and made ready in another tank, the above-mentioned alloy pieces were immersed for 15 seconds, then thoroughly rinsed with deionized water and then they were dried for 15 minutes in a warm air dryer set to 90° C. The copper wire was taken out of the titanium alloy pieces placed on a clean aluminum foil, the pieces were wrapped up together, then put in a plastic bag, sealed and stored. In this work, no fingers touched the surfaces to be joined, that is, the end portion on the opposite side from where each hole was made).

Two days later, one of the pieces was cut and observed with an optical microscope, an electron microscope and a scanning probe microscope. The results of observation with the electron microscope are shown in the micrographs of FIGS. 5 and 6. The surface configuration was not a uniform pattern and, as can be seen in the micrograph of FIG. 5 in magnification of 10,000 times, the surface was a mixture of dome-like shapes and dead leaf-like shapes. The basic structure was probably a mixture of different types of metal crystals and it is surmised that different surfaces were formed when these were etched. The micrograph of FIG. 6 in magnification of 100,000 times is an enlargement of just one of these but there are few bumps with a nanometer period, be it dome-like portions or dead leaf-like portions, or to put this in another way the surface had the feel of a slick ceramic and was not the ultrafine surface that would be expected for injection joining or adhesive joining.

However, the dead leaf-like portions were three-dimensional and seemed to serve as spikes. In other words, the configuration of the alloy surface after the treatment was different from the ultrafine textured shape that was anticipated by the inventors under their general theory, with the overall period on the larger side but with the shape being three-dimensional enough to cancel it out. This will be discussed below but seems to be the reason that a certain injection joining strength was obtained. In observation with a scanning probe microscope, roughness in which RSm was 1.5 to 2.5 μm and Rz was 1.2 to 2.1 μm was observed through four scans of 20 μm, the Rz value was large in relation to the value of RSm and here again there was an overall three-dimensional appearance.

Further one day later, the remaining titanium alloy pieces 1 were taken out, the portion with the hole was grasped with a glove so that no oil or the like would adhere and each piece was inserted into a metallic mold for injection molding 10. The metallic mold for injection molding 10 was closed and the PPS composition (1) obtained in Preparation Example 1 was injected at an injection temperature of 310° C. The mold temperature was 140° C. and 20 of the integrated composites 7 shown in FIG. 2 were obtained. The size of the resin part was 10 mm×45 mm×5 mm and the joining face 6 measured 10 mm×5 mm (0.5 cm$^2$). The composites 7 were placed for 1 hour in a hot air dryer at the temperature of 170° C. on the day of molding to anneal them and then one day later they were subjected to tensile test, which revealed the average shear breaking strength to be 25 MPa.

BRIEF DESCRIPTION OF THE DRAWINGS

FIG. 1 is a cross sectional view schematically illustrating a metallic mold for manufacturing a composite of metal and resin (a titanium alloy substrate and a resin composition);

FIG. 2 is an exterior view schematically illustrating a composite of metal and resin (a titanium alloy substrate and a resin composition);

FIG. 3 is a photograph as a result of observation with an electron microscope in magnification of 10,000 times of a pure titanium-based titanium alloy piece that had been etched with an ammonium monohydrodifluoride aqueous solution, rinsed with water and dried;

FIG. 4 is a photograph as a result of observation with an electron microscope in magnification of 100,000 times of a pure titanium-based titanium alloy piece that had been etched with an ammonium monohydrodifluoride aqueous solution, rinsed with water and dried;

FIG. 5 is a photograph as a result of observation with an electron microscope in magnification of 10,000 times of an α-β type titanium alloy piece that had been etched with an ammonium monohydrodifluoride aqueous solution, rinsed with water and dried; and FIG. 6 is a photograph as a result of observation with an electron microscope in magnification of 100,000 times of an α-β type titanium alloy piece that had been etched with an ammonium monohydrodifluoride aqueous solution, rinsed with water and dried.

DESCRIPTION OF THE REFERENCE NUMBERS

1 Substrate of titanium alloy
2 Movable mold plate
3 Stationary mold plate
4 Resin composition
5 Pinpoint gate
6 Joining face
7 Composite
10 Metallic mold for injection joining

What is claimed is:

1. A method for manufacturing a composite of metal and resin, comprising:
 a shaping step of shaping a titanium alloy substrate by mechanical working,
 a chemical etching step of immersing said shaped substrate in an aqueous solution containing ammonium monohydrodifluoride and rinsing the same with water for providing said shaped substrate with an ultrafine textured face in which protrusions with a height, width and length of at least 10 nm rise up at a spacing of at least 10 nm in observation with an electron microscope on a face that has a surface roughness made up of a textured face with a maximum height of roughness of 0.5 to 5 μm at a period of 1 to 10 μm,
 an insertion step of inserting said substrate that has undergone said chemical etching into a metallic mold for injection molding, and
 an integration step of injecting a first resin composition or a second resin composition onto said inserted substrate and integrating said substrate with the first resin composition or the second resin composition;
 said first resin composition being one in which a polyphenylene sulphide resin as the main component is contained by 70 to 97 wt % as resin components and a polyolefin resin as an auxiliary component is contained by 3 to 30 wt % as resin components, and
 said second resin composition being one in which a polybutylene terephthalate resin as the main component is contained by 70 to 97 wt % as resin components and a polyethylene terephthalate resin and/or a polyolefin resin as an auxiliary component/components is/are contained by 3 to 30 wt % as resin components.

2. The method according to claim 1, wherein in the integration step, the first resin composition is injected onto said inserted substrate.

3. The method according to claim 1, wherein the composite of the metal and the resin has a shear breaking strength between 8 MPa and 26.5 MPa.

4. The method according to claim 2, wherein the composite of the metal and the resin has a shear breaking strength between 8 MPa and 25 MPa.

* * * * *